United States Patent
Khoury et al.

[11] Patent Number: 6,137,601
[45] Date of Patent: Oct. 24, 2000

[54] INCOHERENT ERASURE JOINT TRANSFORM CORRELATOR

[75] Inventors: Jehad Khoury, Concord, N.H.; Charles Woods, Stow, Mass.

[73] Assignee: The United States of America as represented by the Secretary of the Air Force, Washington, D.C.

[21] Appl. No.: 08/723,485

[22] Filed: Oct. 3, 1996

[51] Int. Cl.[7] .................................................. G03H 1/02
[52] U.S. Cl. ........................ 359/7; 359/29; 359/559; 359/561
[58] Field of Search .................... 359/7, 10, 11, 359/29, 559, 560, 561; 356/71; 382/209, 210, 278

[56] References Cited

U.S. PATENT DOCUMENTS

| | | | |
|---|---|---|---|
| 4,674,824 | 6/1987 | Goodman et al. | 359/7 |
| 5,337,170 | 8/1994 | Khoury et al. | 359/7 |
| 5,493,444 | 2/1996 | Khoury et al. | 359/559 |
| 5,604,634 | 2/1997 | Khoury et al. | 359/7 |

OTHER PUBLICATIONS

Vainos et al., "Real Time Edge Enhancement by Active Spatial Filtering via Five Wave Mixing in Photorefractive BSO", Optics Communications, vol. 59, No. 3, pp. 167–172, Sep. 1986.

*Primary Examiner*—Jon W. Henry
*Assistant Examiner*—Darren E. Schuberg
*Attorney, Agent, or Firm*—Stanton E. Collier

[57] ABSTRACT

A holographic grating is written into a photorefractive erasable holographic member and a light beam having a first wavelength which includes the joint power spectrum of a pair of joint images to be correlated is directed at the photorefractive member to partially erase the grating. A phase conjugate signal from the partially erased grating is then readout and Fourier transformed to produce the correlation output spots.

15 Claims, 1 Drawing Sheet

INCOHERENT ERASURE JOINT TRANSFORM CORRELATOR

STATEMENT OF GOVERNMENT INTEREST

The invention described herein may be used by or for the Government for governmental purposes without the payment of any royalties thereon.

BACKGROUND OF THE INVENTION

The present invention relates to the field of image correlators.

The joint transform correlator (JTC) is well known to be one of the most convenient devices for correlating two images, since there is no need to fabricate separate holographic filters, such as the matched filter or the phase only filter. The classical joint transform correlator requires a quadratic processor in the Fourier plane. In the last decade many scientist have shown that it is possible to introduce nonlinearties in the image plane in order to improve the performance of these correlators. The joint transform correlator has been implemented so far in two ways. The first approach is based on using a camera as the nonlinear square low receiver, and a computer for digital image enhancement as well as for interfacing with other spatial light modulators, and finally a spatial light modulator to receive the processed data from the computer. The second approach is based on using an all optical spatial light modulator.

The disadvantages in the use of these approaches are that: most the spatial light modulators are binary in performance, which limit the use of many of the algorithms for image enhancement in the fourier plane; secondly, all the pixelated spatial light modulators have limited resolution; thirdly those based on using digital processing have serious limitations on speed due to the intermediate digital processing. To overcome these problems we employ a new category of nonlinear joint transform correlator which is based on using real-time holography. These correlators can be readily tuned from the matched filter to the phase-extraction limit and thus enhance signal detection in noisy environments by compressing the spectra of both the signal and the noise.

Our first design was based on energy transfer in a two-beam coupling JTC using barium titanate; see U.S. Pat. No. 5,493,444 to Khoury et al., and J. Khoury et al., Optical Society of America. B, 11, 11(1994). However, many fast real-time holographic materials, such as polymers and certain geometries of multiple quantum wells, cannot be used in this design because they do not produce two-beam coupling. Our second design was based on four-wave mixing as an alternative to two-beam coupling, utilizing a self-pumped phase-conjugator to retroreflect the joint spectra. See J. Khoury et al., Applied Optics, 33, 35 (1994). This design does not at present appear attractive because efficient self-pumped phase conjugation is slow. We therefore proposed a grating erasure JTC based on the incoherent erasure of real-time holograms.

BRIEF SUMMARY OF AN EMBODIMENT OF THE INVENTION

The preferred method of the invention writes a holographic grating into an erasable holographic member with light having a first wavelength longer than the wavelength of light of the joint image power spectra. The longer wavelength joint power spectra of the images to be correlated partially erases the grating, and readout light reads out the resulting phase conjugate, which is inversely transformed to produce the correlation output signals. This improved JTC represents an alternative design of the aforesaid two beam coupling correlator which eliminates the undesirable high beam intensity ratios and thus the need for high power lasers.

The JTC of the invention operates with a tunable nonlinearity which can be adjusted to operate from the matched filter to the phase extraction limit (or inverse filter). The nonlinear transfer function of the invention is controlled by the joint spectral intensity of the transformed images at the Fourier plane. The classical matched filter is produced in the joint transform low light intensity limit, while the inverse filter is produced in the joint transform high intensity limit. Such tunability is very important for detecting signals in various noise environments. For example, the matched filter has proven to be effective for additive Gaussian noise but fails to detect signals in clutter that can be detected by the phase only filter. The main operating improvements of the JTC of the present invention are the increased speed and reduced noise provided by the use of a second wavelength for the erasure light beam which need not be coherent with the grating write and readout beams. Using a shorter wavelength for the erasure light carrying the side-by-side joint input and reference images to be correlated, enables fast, low power nonlinear operation into the saturation region, and allows easy separation of any erasure light noise from the correlation output signals.

BRIEF SUMMARY OF THE DRAWINGS

Other features and advantages of the invention will become more apparent upon study of the following descriptions, taken in conjunction with the drawings in which.

DETAILED DESCRIPTION OF PREFERRED EMBODIMENTS OF THE INVENTION

Figure 1:
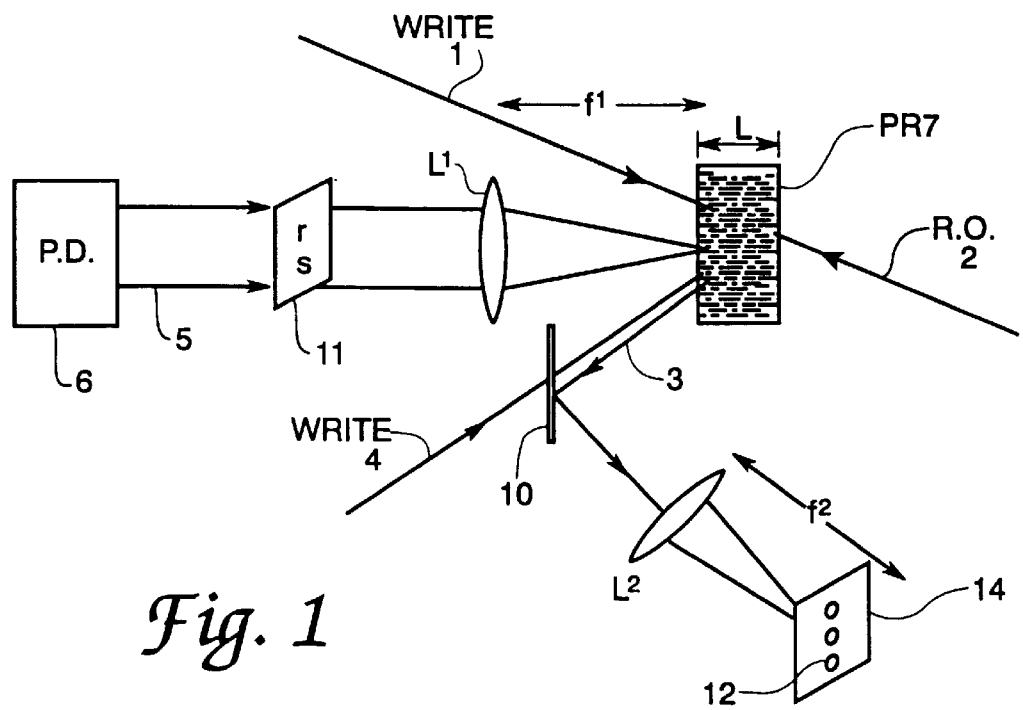
FIG. 1 discloses a presently preferred embodiment of the invention.

A presently preferred embodiment of the invention is shown in the experimental setup of FIG. 1. A temporally coherent set of beams of wavelength $l_c$ establishes a four-wave-mixing arrangement. Beams 1 and 4 write a grating and beam 2 is the readout which produces beam 3, the phase conjugate output beam, deflected off of beam splitter 10 and directed at inverse transform lens L2. The erasure beam 5 uses light that need not be temporally coherent with the coherent light of the other beams. Such light can be conveniently produced by a low power laser diode source 6 directed at image input plane 11. The power spectra of the scene $S(n_x, n_y)$ and the reference $R(n_x, n_y)$, produced by Fourier transform lens L1, intercepting the erasure beam, are focused on an erasable real time holographic storage media or holographic member, which can take the form of photorefractive crystal 7. Thus we provide a recordation means for writing a holographic grating into the erasable holographic member by directing light therein, namely beams 1 and 4, having a first wavelength of light such as green light. The erasure means beam 5, has a second lower wavelength such as the color blue, and contains the joint power spectrum of the images r and s to be correlated. This beam partially erases the recorded grating in crystal 7. The readout means comprises the readout beam 2, coherent with the write beams, which produces the phase conjugate output beam 3, which is inverse Fourier transformed by lens L2 to produce the conventional image correlation spots 12 at output plane 14.

Here $n_x$ and $n_y$ are the spatial frequency coordinates. The generation of charge carriers by the absorption of the joint spectrum carried by erasure beam 5, erases the existing grating and this erasure depends on the intensity $|R(n_x,n_y)+S(n_x,n_y)|^2$. The erasure beam 5 can be temporally incoherent to the other beams but must have at least partial spatial coherence to produce the joint transform of the input signal s and the reference signal r at input plane 11. This beam may be produced by a variety of optical techniques including those of white light processing.

We consider a holographic storage medium such as photorefractive crystal PR7 of FIG. 1, with coupling coefficient $\gamma^l$, thickness L, and a small absorption coefficient. Before the erasure beam 5 is introduced, the phase-conjugate beam amplitude $A_{30}$ for the undepleted pump case is given by:

$$A_{30} = \frac{A_1 A_4^* \gamma l}{I_c}$$

where $A_j$ is the amplitude of the $j^{th}$ beam and $I_c$ is the sum of the intensities of the coherent beams 1, 2, and 4.

The erasure beam 5 does not couple with the existing beams 1, 2, and 4, due to strong violation of the Bragg conditions, but the total absorbed intensity increases. Considering a monochromatic source (e.g. a second laser) of wavelength $1_i$, the modulated phase-conjugate beam amplitude is given by:

$$A_3(v_x, v_y) = \frac{(A_1 A_4^* A)_2 \gamma L}{I_c + I_i Z_{\alpha,\lambda} |R(v_x, v_y) + S(v_x, v_y) \frac{|^2}{(\lambda_i f_1))^2}}$$

where 1i is the incoherent intensity (of the erasure beam) before the input plane, $f_1$ is the L1 transform lens focal length shown in FIG. 1, and $Z_{q,1}$ is a dimensionless factor which depends on the absorption coefficients and wavelengths of the incoherent and coherent beams and can strongly enhance the incoherent erasure.

The modulation depth $d(n_x,n_y)$, $$A_3 = A_{30}[1 - d(v_x, v_y)]$$

Then one can show that $$d(v_x, v_y) = \frac{m_e E(v_x, v_y)}{1 + m_e E(v_x, v_y)}$$

where $E(n_x,n_y)$ is the normalized energy spectrum and $m_e$ is the effective beam ratio. This equation is functionally identical to the low-coupling limit of the transfer function of the four-wave mixing JTC: see for example Eq. (4) in the aforesaid Khoury et al. four-wave mixing reference in Applied Optics, 33, 35 (1994). If $E_0$ is the product of the area of the input plane and its DC component, we define $E(n_x,n_y)$ and me as follows:

$$E(v_x, v_y) = \frac{|(R(v_x, v_y) + Rv_x, v_y)|^2}{E_0}$$

$$m_e = Z_{\alpha,\lambda} \frac{E_0}{(\lambda_i f_1)} \frac{I_i}{I_c}$$

Figure 2:
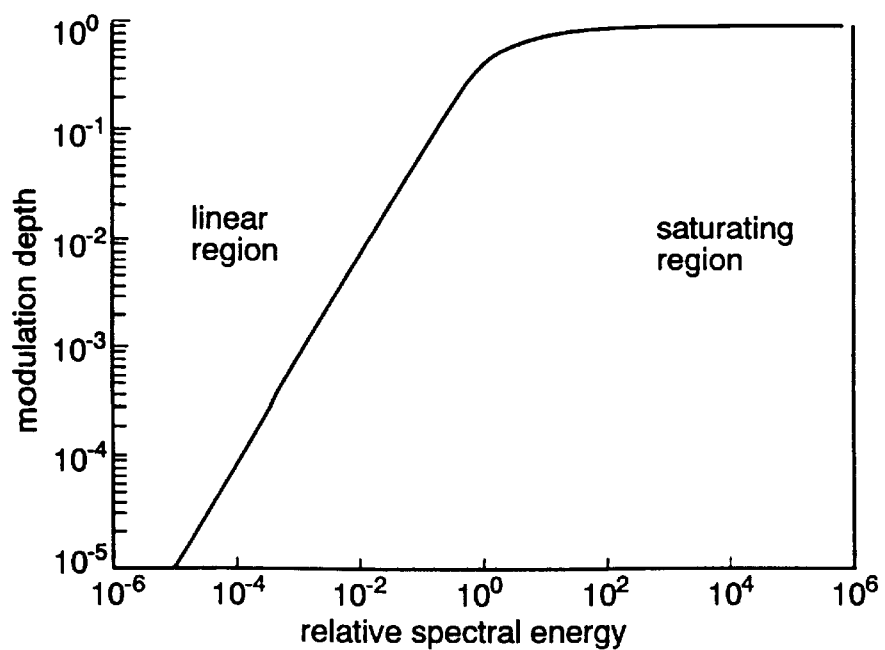
FIG. 2 illustrates a plot of the modulation depth of the phase-conjugate beam amplitude versus the relative spectral energy.

In FIG. 2 we plot the modulation depth $d(n_x,n_y)$ versus the product $meE(n_x,n_y)$), which is the relative spectral energy incident on the crystal. Two distinct patterns are clearly identified: the modulation depth is linear with small energies, while for large energies it is independent of the signal energy. This soft-clipping saturation commences at the point of inflection, where $m_e E=1$. Since the crystal responds to the product $m_e E$, not just the energy E, the value of $m_e$ substantially affects the way the phase-conjugate beam amplitude is modulated.

For a small beam ratio ($<m_e=10^{-2}$) we can set $m_e E(n_x, n_y)<<1$ for all the spectral energy values and the modulation depth can be approximated as:

$$d(v_x, v_y) \cong m_e E(v_x, v_y)$$

This equation agrees with FIG. 2 in that the modulated beam has a linear dependence with small signal energies. This dependence is typical of the matched filter, whose peaks are simply the correlation between the reference and the scene.

For a large beam ratio ($>me=10^3$) we can set $m_e E(n_x,n_y) >>1$, and the modulation depth can be approximated as $$d(v_x, v_y) \cong 1 - \frac{1}{m_e E(v_x, v_y)}$$

This response is independent of the signal intensity at the limit $m_e$Ⓡ¥, is equivalent to the inverse filter and leads to phase extraction. As the beam ratio increases, the nonlinearity at the Fourier plane is transformed from the matched-filter type of the linear section of the left hand portion of the graph of FIG. 2, to the inverse filter type associated with the right hand limiting section of the graph. For intermediate beam ratios the portions of the joint spectrum with low energy, the high frequencies, are amplified by the linear region, and the ones with high energy (low frequencies) are deamplified by the limiting region.

Reference may be made to computer simulations of the JTC of the present invention described in a paper published by Khoury, Asimmelis and Woods in Optics Letters, Vol. 20, No. 22/Nov. 15, 1995, and incorporated by reference herein.

In conclusion, we have presented a new approach to implement the nonlinear joint transform correlator which can be implemented by the erasure of a four-wave mixing grating in a real-time holographic media. The resulting soft-clipping quadratic transfer function is similar to our previous photorefractive implementations. The operation of these nonlinear correlators can be tuned from classical matched to the phase extraction by appropriate selection of the operating point. In addition, low-power operation may be achieved by the proper choice of the wavelength of the erasure beam.

Variations on the described design of the invention will occur to the skilled worker in the art, and thus the scope of the invention is to be defined solely by the terms of the following claims and art recognized equivalents thereof. For example, the skilled worker in the art will appreciate that the erasable grating could be generated in various forms such as (a) by the interference of two electron beams in nonconducting media which can then be discharged (erased by the joint spectrum of the two images which is generated either by light beam or electro beams); (b) by inducing the x3 of the resonant system material by means of two wavelengths one near the resonance and the other at the resonance frequency; and (c) by electronically charging a spatial light modulator, which is then discharged, that is, erased by the light beam of the joint spectrum. Quite possibly, the light modulator electrodes themselves could form the grating. An LCD smart pixel arrangement is also a possibility for carrying out the invention. Also, in the FIG. 1 embodiment, the readout beam need not be temporally or spatially coherent with the write beams. While the erasure beam would normally be a coherent laser diode beam, it need not be coherent with the remaining beams.

What is claimed is:

1. A joint transform correlator comprising:
   (a) an erasable holographic member;
   (b) recordation means for writing a holographic grating into said erasable holographic member by directing light therein having a first wavelength;
   (c) erasure means for directing a joint power spectrum beam, having a second wavelength shorter than said first wavelength, of a pair of joint images to be correlated upon said erasable holographic member for producing a partially erased grating;
   (d) readout means for reading out a grating signal of said partially erased grating; and
   (e) means for transforming said grating signal, readout in accordance with step (d), to produce a correlation output signal.

2. The correlator of claim 1 wherein said erasable holographic member comprises a photorefractive member.

3. The correlator of claim 2 wherein said light having a first wavelength is of a first color and said joint power spectrum beam is of a second color.

4. The correlator of claim 3 wherein said first color is green and said second color is blue.

5. The correlator of claim 1 wherein said light having a first wavelength is of a first color and said joint power spectrum beam is of a second color.

6. The correlator of claim 5 wherein said first color is green and said second color is blue.

7. A joint transform correlator comprising:
   (a) an erasable holographic member;
   (b) recordation means for writing a holographic grating into said erasable holographic member by directing light therein having a first wavelength;
   (c) erasure means for directing a joint power spectrum beam of a pair of joint images to be correlated upon said erasable holographic member for producing a partially erased grating;
   (d) readout means for reading out a grating signal of said partially erased grating; and
   (e) means for transforming said grating signal, readout in accordance with step (d), to produce a correlation output signal.

8. The correlator of claim 7 wherein said erasable holographic member comprises a photorefractive member.

9. The correlator of claim 8 wherein said light having a first wavelength is of a first color and said joint power spectrum beam is of a second color.

10. The correlator of claim 9 wherein said first color is green and said second color is blue.

11. The correlator of claim 7 wherein said light having a first wavelength is of a first color and said joint power spectrum beam is of a second color.

12. The correlator of claim 11 wherein said first color is green and said second color is blue.

13. Method of correlating a pair of joint images comprising the steps of:
    (a) writing a holographic grating into an erasable holographic member by directing light therein having a first wavelength;
    (b) directing a joint power spectrum beam, having a second wavelength shorter than said first wavelength, of a pair of joint images to be correlated upon said erasable holographic member for producing a partially erased grating;
    (c) reading out a grating signal of said partially erased grating; and
    (d) transforming said grating signal, readout in accordance with step (c), to produce a correlation output signal.

14. The method of claim 13 wherein said light having a first wavelength is of a first color and said joint power spectrum beam is of a second color.

15. The method of claim 14 wherein said first color is green and said second color is blue.

* * * * *